(12) United States Patent
Michanickl (10) Patent No.: US 9,044,876 B2
(45) Date of Patent: Jun. 2, 2015

(54) LIGHT DERIVED TIMBER PRODUCT BOARD

(75) Inventor: Andreas Michanickl, Thansau (DE)

(73) Assignee: Kronoplus Technical AG, Niederteufen (CH)

( * ) Notice: Subject to any disclaimer, the term of this patent is extended or adjusted under 35 U.S.C. 154(b) by 0 days.

(21) Appl. No.: 13/512,661

(22) PCT Filed: Dec. 1, 2010

(86) PCT No.: PCT/EP2010/007305
§ 371 (c)(1),
(2), (4) Date: Jul. 9, 2012

(87) PCT Pub. No.: WO2011/066963
PCT Pub. Date: Jun. 9, 2011

(65) Prior Publication Data
US 2012/0270973 A1    Oct. 25, 2012

(30) Foreign Application Priority Data

Dec. 2, 2009  (DE) .................... 10 2009 056 843 U (51) Int. Cl.
*C08L 97/02* (2006.01)
*B27N 3/00* (2006.01)

(52) U.S. Cl.
CPC . *B27N 3/00* (2013.01); *C08L 97/02* (2013.01); *B27N 3/005* (2013.01)

(58) Field of Classification Search
CPC ........... B27N 3/00; B27N 3/005; C08L 97/02
USPC ..................................................... 524/13, 14
See application file for complete search history.

(56) References Cited

U.S. PATENT DOCUMENTS

| | | | |
|---|---|---|---|
| 4,246,310 A | 1/1981 | Hunt | |
| 5,436,069 A | 7/1995 | Winterowd | |
| 6,589,660 B1* | 7/2003 | Templeton et al. | 428/452 |
| 6,833,183 B2* | 12/2004 | Klasterka | 428/323 |
| 8,304,069 B2 | 11/2012 | Gehringer | |
| 2003/0150522 A1 | 8/2003 | Suzuki | |
| 2005/0019548 A1 | 1/2005 | Liu | |
| 2010/0297425 A1 | 11/2010 | Gehringer | |
| 2011/0003136 A1* | 1/2011 | Schmidt et al. | 428/313.5 |

FOREIGN PATENT DOCUMENTS

| | | |
|---|---|---|
| CA | 2244005 A1 | 2/1997 |
| CA | 2244005 C * | 3/2008 |

(Continued)

OTHER PUBLICATIONS

Nimz et al. "Wood," Ullmann's Encyclopedia of Industrial Chemistry, 2012, vol. 39, p. 453-505.*
Office Action for corresponding DE application 102009056843.3-15, dated Aug. 10, 2010.
International Preliminary Report on Patentability for corresponding PCT Application No. PCT.EP2010/007305, dated Jul. 12, 2012.

(Continued)

*Primary Examiner* — Liam J Heincer
*Assistant Examiner* — Nicholas Hill
(74) *Attorney, Agent, or Firm* — Matthew B. Dernier, Esq.; Gibson & Dernier LLP (57) ABSTRACT

The invention relates to a light, single-layer derived timber product board which is distinguished by having a bulk density of below 500 kg/m³ and consisting of a mixture of crushed and sliced chips. Furthermore, the invention relates to a method for the production of such a light, single-layer derived timber product board.

13 Claims, 5 Drawing Sheets

(56) References Cited

FOREIGN PATENT DOCUMENTS

| DE | 3623624 A1 | 1/1988 |
| DE | 19526032 A1 | 2/1997 |
| DE | 202006020503 U1 | 10/2008 |
| WO | 2005018890 A1 | 3/2005 |
| WO | 2008046892 A2 | 4/2008 |
| WO | WO 2008046892 A2 * | 4/2008 |

OTHER PUBLICATIONS

International Search Report for corresponding application PCT/EP2010/007305, dated Mar. 17, 2011.
Office Action for corresponding Chinese Patent Application No. 201080062016.5, dated Nov. 29, 2013.
Office Action for corresponding Chinese Patent Application No. 201080062016.5, dated Jul. 11, 2014.

* cited by examiner

View section AA

LIGHT DERIVED TIMBER PRODUCT BOARD

BACKGROUND

The invention relates to a light, single-layer derived timber product board which is distinguished by having a bulk density of below 500 kg/m$^3$ and consisting of a mixture of crushed and sliced chips. Furthermore, the invention relates to a method for the production of such a light, single-layer derived timber product board.

Conventional chipboards normally have a three-layer construction in order to ensure good coatability. In the middle layer, somewhat larger chips are thereby used whilst, in the outer layers, normally smaller chips which produce extensively continuous surfaces are used.

The small chips require increasingly also to be produced from round wood since wood shavings are increasingly processed to form fuel pellets. The production of smaller chips made of wood therefore requires a great deal of energy. In addition, these require more gluing because of their small size.

In order to achieve adequate gluing of these small chips, the outer layers constructed from the small chips must be very highly compressed. As a result, it is necessary to produce the chipboards with a comparatively large quantity of material, which causes high bulk densities in the case of three-layer boards. However, in addition to high weight and high material consumption, high bulk densities also demand high electrical and thermal energy expenditure and also extensive use of machines for the production of such three-layer boards.

SUMMARY OF THE INVENTION

Starting herefrom, it is the object of the present invention to propose a light, single-layer derived timber product board which is distinguished, on the one hand, by a low bulk density and, on the other hand, by being coatable easily and well with conventional coatings. Furthermore, it is the object of the present invention to indicate a production method for the production of such a derived timber product board.

Various embodiments are described herein with respect to the light single-layer derived timber product board and methods for the production of the material board according to various aspects.

According to the invention, a light, single-layer derived timber product board is hence proposed according to claim 1, said board consisting of a mixture of crushed and sliced chips and the proportion of crushed chips being between 5 and 30% and the proportion of sliced chips 70 and 95% by weight. The derived timber product board according to the invention is distinguished in particular by having a bulk density of below 500 kg/m$^3$.

In the case of derived timber product board according to the invention, reference is made in particular to the fact that the board, although it has a single-layer configuration and has a low bulk density, displays physical properties which are comparable to those three-layer boards known from the background art. This applies in particular to the bending strength and transverse tensile strength. Hence far-reaching advantages result since the board according to the invention is very light and hence easy to handle and, also with respect to handling, i.e. manipulating and storage, crucial advantages hence result. The board according to the invention can also be coated very easily or even joined to yet further boards, if required, to form a composite.

In the case of the derived timber product board according to the invention, reference is made in addition to the fact that the production is significantly more economical since low wood and energy use is required which is generally below those of conventional chipboards by one third, i.e. in the case of three-layer construction or high bulk density.

The derived timber product board according to the invention can thereby be constructed such that the crushed and sliced chips are distributed essentially uniformly in the derived timber product board or else such that the sliced chips are disposed at least partially on the upper- and underside of the board surface and the crushed chips predominantly in the middle. Such different configurations of the derived timber product board can be achieved very simply by scattering methods which are known per se in the state of the art.

In particular the variant in which the sliced chips are disposed at least partially on the upper- and underside of the board surface (i.e. which form board surfaces), confers the advantage that an optimal flat surface can consequently be achieved on the upper- and underside so that this embodiment is suitable in particular for coating because of the flat board upper- and underside. In this embodiment, it is thereby particularly preferred if the procedure is thereby such that the scattering process is controlled such that essentially only the large-area sliced chips are oriented, during scattering, at least partially preferably towards the upper- and underside of the subsequent board surface. The smaller sliced chips and the crushed chips are then preferably disposed in the middle. Large sliced chips in the sense of the invention are sliced chips which are at least 10 mm long and 3 mm wide, preferably at least 20 mm long and at least 5 mm wide. All chips smaller than 10 mm in length and 3 mm in width are small sliced chips.

In the case of the derived timber product board according to the invention, predominantly types of wood, the bulk density of which is <500 kg/m$^3$, are used in order to ensure the bulk density of below 500 kg/m$^3$. The derived timber product board according to the invention can hence be formed either completely or at least predominantly from types of wood, the bulk density of which is <500 kg/m$^3$.

The sliced or crushed chips used in the case of the derived timber product board according to the invention are produced according to the method known in the state of the art. Thus the sliced chips can be produced by cutting on knife-ring cutters or knife-shaft cutters or other cutting methods known in the state of the art. For the cutting, wood chips, on the one hand, but also round wood can be used. The sliced chips which are produced with such cutting methods usually have a thickness of approx. 0.2 to 0.9 mm, preferably of 0.3 to 0.6 mm and a length of 5 to 500 mm, preferably of 25 to 45 mm, and a width of approx. 3 to 30 mm, preferably of 5 to 20 mm. However, as a function of the cutting method, the length of the chips can also be 15 to 145 mm, for example if round wood is cut with a knife-ring cutter.

The crushed chips which are used for the derived timber product board according to the invention are contained with a lower proportion, namely with 5 to 30%, preferably with 10 to 30%, in the derived timber product board. The production of such crushed chips is likewise known in the state of the art and is normally effected by crushing mills or other mills. As a result, crushed chips which consist of coarser, thicker chips or particles and which have a matchstick-like, stick-like or cubic character can be produced. Such chips or particles usually have then a low slenderness ratio with simultaneously lesser width of 0.5 to 4 mm and a thickness of 0.5 to 4 mm, preferably of 1 to 2 mm.

In the production of chips for the board according to the invention, also very fine chip material or sawdust can be produced to a lesser extent. Such fine material can be jointly processed or separated from the chips, in order to improve the board properties, with a screen mesh width of below 2.5 mm, preferably of below 1.5 mm.

The derived timber product board according to the invention preferably has a thickness of 6 to 200 mm, particularly preferred of 12 to 40 mm. As known per se in the state of the art, the bulk density of the derived timber product board according to the invention can also be influenced still further by the board comprising in addition 5 to 50%, relative to the proportion of wood, of foamed particles, such as e.g. polystyrene- and/or polyurethane particles.

As glue for gluing the chips together and hence for forming the derived timber product board, any glue known per se in the state of the art can be used. It is thereby preferred if 2 to 16% of glue, relative to the proportion of wood, is used. There may be mentioned as examples of suitable glues, isocyanate adhesive, polyurethane adhesive, polycondensation adhesive with or without extenders, acrylate-containing adhesives, polyurethane adhesives, polycondensation adhesives with or without extenders, acrylate-containing adhesives or mixed resins from the state of the art.

The single-layer derived timber product board according to the invention can of course be provided, as is known in the field of chipboards, also with coatings.

The at least one coating can thereby consist of a planar material with a bulk density of more then 500 kg/m$^3$. However, the invention also comprises embodiments in which the at least one coating consists of a finish film, a laminate material (HPL/CPL), a different paper- or fibrous material or of a plastic material film which normally has a thickness of more than 0.1 mm.

The coating materials, as mentioned above, can be glued easily to the single-layer board according to the invention by a water-free adhesive, such as e.g. a hot-melt adhesive, or a water-free polyurethane adhesive. In the case of the coatings as mentioned above, it is particularly preferred if the at least one finish film for the coating has a thickness of 0.05 to 0.5 mm, preferably of 0.1 to 0.3 mm.

The at least one finish film for the coating can also be produced from a base paper with a basis weight of 20 to 200 g/m$^3$, preferably of 50 to 100 g/m$^3$.

Furthermore, the at least one finish film can then have a basis weight of 80 to 350 g/m$^2$, preferably of 120 to 250 g/m$^2$, relative to the completed finish film.

The board according to the invention which is provided for the coating normally has a bulk density of approx. 360 to 480 kg/m$^3$, preferably of 400 to 440 kg/m$^3$.

Furthermore, the invention comprises a method for the production of a light, single-layer derived timber product board, as described above. According to the method according to the invention, the chips are mixed, for this purpose, in the weight ratios indicated as in claim 1 and covered with glue in a drum mixer, and then scattered with at least one scattering head and also subsequently compressed under pressure and temperature to form the derived timber product board. The procedure preferably takes place in a continuous method.

It is thereby preferred that the chips are covered with glue in a drum mixer, such as is used for example in OSB production, in order as far as possible not to damage the chip structure. In the case of the method according to the invention, it is advantageous furthermore if compression of the continuously scattered chip mat is effected on a continuous double band press or a continuous steam injection press or a steam/air injection press because a particularly high reduction in bulk density can consequently be achieved.

The scattering of the chips of this single-layer, light derived timber product board can be effected by mechanical scattering by rolling with only one scattering head or, in the case of very large production quantities, with two scattering heads. Three or four scattering heads, as in the production of conventional three-layer chipboards, are not absolutely necessary.

Covering the chips of the derived timber product board according to the invention with glue is effected advantageously with a drum mixer and not with a compulsory mixer which regrinds the chips and is normal in chipboard production. Such drum mixers are known from the production of oriented strand board and are normally used there for covering very large chips with a length of over 100 mm with glue. The drum mixer is advantageously modified somewhat for covering the chips of the derived timber product board according to the invention with glue since the chips thereof are shorter than in the case of oriented strand board. For this purpose, more and longer entrainers which whirl up the chips are fitted on the inside of the drum.

The chips of the derived timber product board according to the invention can be glued with the known gluing systems. When using polycondensation glues, in particular when using urea-formaldehyde glues, the addition of extenders, such as e.g. rye flour, in the order of magnitude of 10 to 100% relative to the solid resin, is advantageous for obtaining optimum strength properties.

In order to produce the board, sliced and crushed chips are used. Large-area sliced chips, which are produced for example by cutting round wood with a knife-shaft cutter, contribute particularly to good bending-resistance and a favourable modulus of elasticity and enable good coatability. This is the case in particular if, during scattering, they are scattered by corresponding adjustment of the scattering machine predominantly outwards towards the broad faces or surfaces of the light, derived timber product board. The proportion of these chips then decreases inwards from the outsides of the derived timber product board according to the invention. However, the board remains of a single-layer construction.

In addition, for the production of the board from wood chips by cutting via a knife-ring cutter, rather there are used narrow, long sliced chips compared with the above-mentioned chips.

Furthermore, thick to cubic crushed chips produced from wood chips via a mill are used. These improve the transverse tensile strength and resistance to screws being pulled out of the light, single-layer derived timber product board according to the invention.

The mixing ratio of the chips for the production of the light single-layer board according to the invention is advantageously approx. 5 to 30% of crushed chips and 70 to 95% of sliced chips.

It is thereby advantageous if, according to the availability of round wood for the cutting, the sliced chips consist rather, at approx. 20 to 90%, of wide chips which are produced from round wood via a knife-shaft cutter or also a knife-ring cutter for round wood, and rather, at 10 to 80%, of narrow sliced chips which are produced from wood chips via a knife-ring cutter for wood chips.

Also dispensing with chips produced from wood chips via a knife-ring cutter is possible if round wood is available economically.

The mixing ratio of the chips will be adapted to the availability and the price of wood chips and round wood.

BRIEF DESCRIPTION OF THE DRAWINGS

The invention is explained subsequently in more detail with reference to examples 1 to 6 and also FIGS. 1 to 5.

There are thereby shown

DETAILED DESCRIPTION OF THE INVENTION

EXAMPLES

Example 1

Via a knife-shaft cutter, spruce industrial round wood is cut into thin chips with a length of approx. 30 mm. Spruce wood chips are cut via a knife-ring cutter into thin chips of at most 35mm length. With a crushing mill, further spruce wood chips are comminuted into narrow crushed chips of approx. 1.5mm thickness. 20% of crushed chips are mixed with 40% of chips produced via the knife-shaft cutter and 40% of chips produced via the knife-ring cutter and dried. The fine material contained in this mixture and the sawdust likewise contained therein are separated via a vibrating screen with a mesh width of 0.8mm. The chip material freed of dust and fine material is covered with 4% PMDI (adhesive) glue relative to the chip mass. The glued chips are formed into a single-layer chip mat via a scattering head, which chip mat is then compressed with a continuous double band press to form a board with a bulk density of 420kg/m$^3$. The thus produced light, single-layer derived timber product board has the material characteristic values represented in the table situated below.

Example 2

Like example 1, but during the scattering of the mat it is achieved via adjustment of the scattering rollers that only thin, flat chips but no thick crushed chips reach the upper- and the underside of the chip mat. After compression of this chip mat, the thus produced light, single-layer board has very even surfaces without small depressions. The material characteristic values correspond to the values, represented in the table below, of the light, single-layer derived timber product board according to the invention. Here also, covering the chips with PMDI glue and compression of the scattered chip cake is effected on a continuous double band press.

Example 3

Like example 1, but instead of spruce round wood and spruce wood chips, willow round wood and willow wood chips are used.

Example 4

Like example 1, but a mixture of spruce round wood and soft deciduous wood (willow, poplar) and a mixture of spruce wood and soft deciduous wood chips are used.

Example 5

Like example 1, but 20% of crushed chips and 80% of chips produced via a knife-shaft cutter are used. As a result, the surface continuity is further improved.

Example 6

Like example 1 to 6, but compression of the scattered chip mat (chip cake) is effected not on a continuous double band press but on a continuous steam injection press.

TABLE

Table: characteristic properties (strength properties, thicknesses and bulk densities) of a light, single-layer, derived timber product board according to the invention and a conventional chipboard.

|  | Single-layer, light derived timber product board according to the invention | Conventional, three-layer chipboard |
|---|---|---|
| Thickness [mm] | 19 | 19 |
| Bulk density [kg/m$^3$] | 420 | 650 |
| Bending strength [N/mm$^2$] | 14 | 13 |
| Modulus of flexural elasticity [N/mm$^2$] | 1,800 | 1,700 |
| Transverse tensile strength [N/mm$^2$] | 0.4 | 0.45 |
| Moisture content [%] | 6 | 6 |
| Thickness swelling after 24 h water storage [%] | 12 | 13 |

Figure 1:
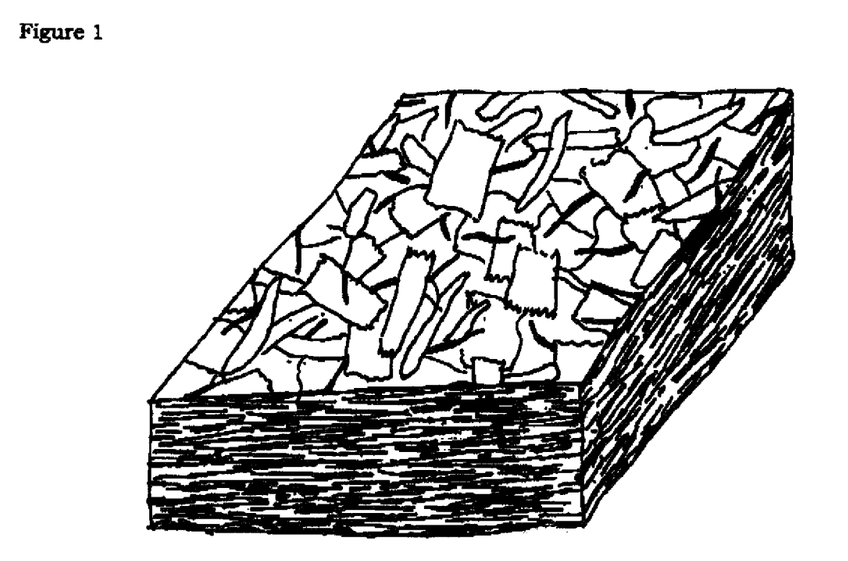
FIG. 1 in a perspective representation, a derived timber product board according to the invention with uniformly distributed chips, FIG. 2 likewise in perspective representation, a derived timber product board according to the invention in which the surfaces of the board according to the invention are covered completely by flat sliced chips, FIG. 3 a greatly enlarged section through the surface of the board according to FIG. 1, FIG. 4 a greatly enlarged section of the surface of the board according to FIG. 2, FIG. 5 slightly enlarged examples of different types of chips.

FIG. 1 shows, enlarged, a light derived timber product board according to the invention according to claim 1, in which the chips used for production are distributed uniformly over the entire board thickness. Even the thicker crushed chips (illustrated dark) are on the board upper sides.

Figure 2:
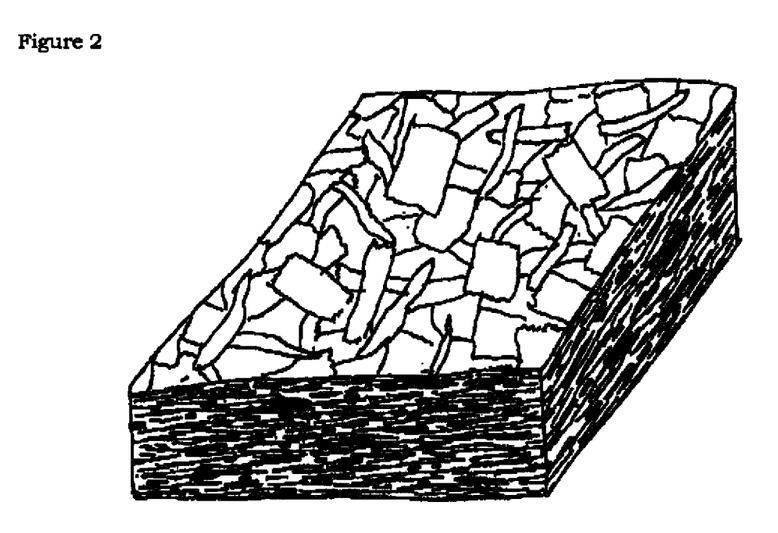

FIG. 2 shows, enlarged, a light derived timber product board according to the invention according to claim 2, in which the thicker crushed chips are not situated or only rarely on the board upper sides. In the case of this board also, the chips are mixed firstly in the desired mixing ratio and covered with glue. During scattering, the scattering machine is however adjusted such that the crushed chips are always or almost always still covered by flatter sliced chips.

Figure 3:
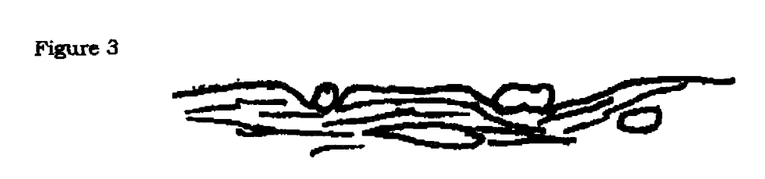

FIG. 3 shows a greatly enlarged section through the surface of a light, derived timber product board according to the invention according to claim 1. The crushed chips which are thick in comparison with the sliced chips are also situated on the surface of the board. They press the thin sliced chips into the board. As a result, the surface of the board is uneven or has small depressions which are unfavourable for subsequent coating.

Figure 4:
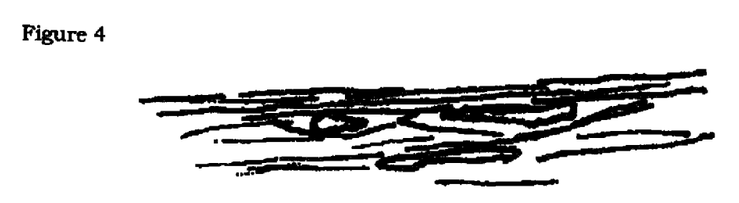

FIG. 4 shows a greatly enlarged section through the surface of a light derived timber product board according to the invention according to claim 2. The thicker crushed chips are covered by thin sliced chips. The surface of the board is consequently more even than in the board in FIG. 1 in which crushed chips are also situated on the surface.

Figure 5:
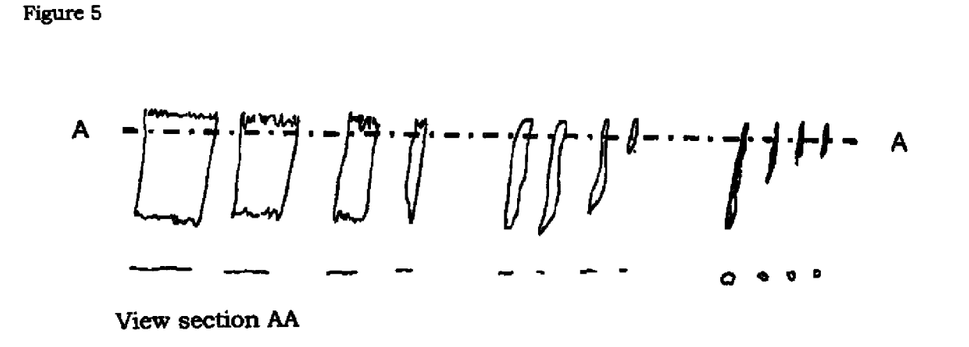

FIG. 5 shows, slightly enlarged, examples of different types of chips which are used for production of the light derived timber product board according to the invention. A plan view on the chips is seen at the top in the picture. A cross-section through the width of the chips is represented thereunder. On the left and in the middle, examples of sliced chips are represented, on the extreme right examples of crushed chips. The chips on the extreme left can be produced for example from round wood with a knife-shaft cutter. They are more uniformly long and thin. As a result of the cutting process, they are rather somewhat frayed at the ends. In the middle, four example of wood chips are represented, which can be produced for example by cutting wood chips by means of a knife-ring cutter for wood chips. These chips are likewise relatively thin and long but more non-uniformly wide. On the extreme right, four examples of crushed chips are represented. Rather these are narrow and thick (matchstick-like or stick-like) and cause stiffening of the light board which leads to higher bending strengths and transverse tensile strengths.

The invention claimed is:

1. A light, single-layer timber product board, comprising:
   wooden chips being a mixture of crushed chips and sliced chips which are glued together, wherein the board has a bulk density of below 500 kg/m$^3$,
   wherein the proportion of crushed chips is between 5 and 30% of the proportion of wooden chips of the board, and the proportion of sliced chips is between 70 and 95% of the proportion of wooden chips of the board, and
   a length of the crushed chips and sliced chips is on average below 40 mm, wherein:
   the sliced chips are produced at least one of: (i) by cutting wood chips on a knife-ring cutter, (ii) by cutting round wood on a knife-shaft cutter, and (iii) by cutting round wood on a knife-ring cutter,
   when the sliced chips are produced by cutting the wood chips on the knife-ring cutter, the sliced chips have: (i) a thickness of about 0.2 to 0.9 mm, (ii) a length of about 15 to 100 mm, and (iii) a width of about 3 to 30 mm; or
   when the sliced chips are produced by cutting round wood on the knife-shaft cutter, the sliced chips have: (i) a thickness of about 0.2 to 0.9 mm, (ii) a length of about 15 to 100 mm, and (iii) a width of about 3 to 30 mm; or
   when the sliced chips are produced by cutting round wood on the knife-ring cutter, the sliced chips have: (i) a thickness of about 0.2 to 0.9 mm, (ii) a length of about 15 to 145 mm, and (iii) a width of about 3 to 30 mm;
   the crushed chips are produced by crushing mills or other mills and have a matchstick-like, stick-like or cubic character, and
   the crushed chips have a low slenderness ratio with simultaneously lesser width of 0.5 to 4 mm and a thickness of 1 to 4 mm.

2. The timber product board according to claim 1, wherein the crushed and sliced chips are distributed essentially uniformly in the timber product board.

3. The timber product board according to claim 1, wherein the sliced chips are disposed at least partially on an upper-side surface and on an underside surface of the board and the crushed chips are disposed predominantly in a middle, between the board surfaces.

4. The timber product board according to claim 1, wherein the board is formed from types of wood with a bulk density less than 500 kg/m$^3$.

5. The timber product board according to claim 1, wherein: the proportion of crushed chips is about 10 to 15% of the proportion of wooden chips of the board.

6. The timber product board according to claim 1, wherein 2 to 16% of glue, relative to the proportion of wooden chips of the board, is present.

7. The timber product board according to claim 6, wherein the glue is selected from an isocyanate adhesive, a polyurethane adhesive, a polycondensation adhesive, an acrylate-containing adhesive and a mixed resin.

8. The timber product board according to claim 1 further comprising 5 to 50% of foamed particles relative to the proportion of wooden chips.

9. The timber product board according to claim 1, wherein the timber product board has a thickness of 6 to 200 mm.

10. A method for the production of a light, single-layer timber product board, comprising:
    mixing, in a drum mixer, wooden chips selected from crushed chips and sliced chips, where a proportion of crushed chips is between 5 and 30% of a proportion of wooden chips, and a proportion of sliced chips is between 70 and 95% of the proportion of wooden chips,
    covering the crushed chips and sliced chips with glue in the drum mixer,
    scattering the crushed chips and sliced chips with at least one scattering head, and
    compressing the crushed chips and sliced chips under pressure and temperature to form the timber product board, wherein
    the board has a bulk density of below 500 kg/m$^3$ and a length of the crushed chips and sliced chips is on average below 40 mm,
    the method further comprises producing the sliced chips at least one of: (i) by cutting wood chips on a knife-ring cutter, (ii) by cutting round wood on a knife-shaft cutter, and (iii) by cutting round wood on a knife-ring cutter;
    when the sliced chips are produced by cutting the wood chips on the knife-ring cutter, the sliced chips have: (i) a thickness of about 0.2 to 0.9 mm, (ii) a length of about 15 to 100 mm, and (iii) a width of about 3 to 30 mm; or
    when the sliced chips are produced by cutting round wood on the knife-shaft cutter, the sliced chips have: (i) a thickness of about 0.2 to 0.9 mm, (ii) a length of about 15 to 100 mm, and (iii) a width of about 3 to 30 mm; or
    when the sliced chips are produced by cutting round wood on the knife-ring cutter, the sliced chips have: (i) a thickness of about 0.2 to 0.9 mm, (ii) a length of about 15 to 145 mm, and (iii) a width of about 3 to 30 mm; or
    the crushed chips are produced by crushing mills or other mills and have a matchstick-like, stick-like or cubic character, and
    the crushed chips have a low slenderness ratio with simultaneously lesser width of 0.5 to 4 mm and a thickness of 1 to 4 mm.

11. The method according to claim 10, wherein the crushed chips and sliced chips are scattered via the at least one scattering head such that the sliced chips are scattered at least partially towards an upper-side surface and underside surface of the board, whilst the crushed chips are scattered preferably away from the surfaces in order to ensure even surfaces of the produced board.

12. The method according to claim 10, characterised in that an essentially homogeneous mixture of crushed chips and sliced chips is scattered via the at least one scattering head.

13. The method according to claim 10, further comprising adding solid or liquid components which are foamed for further reducing the bulk density, or which foam during compression, wherein the solid or liquid components include plastic material particles made of polystyrene or polyurethanes.

* * * * *